Figure 1:
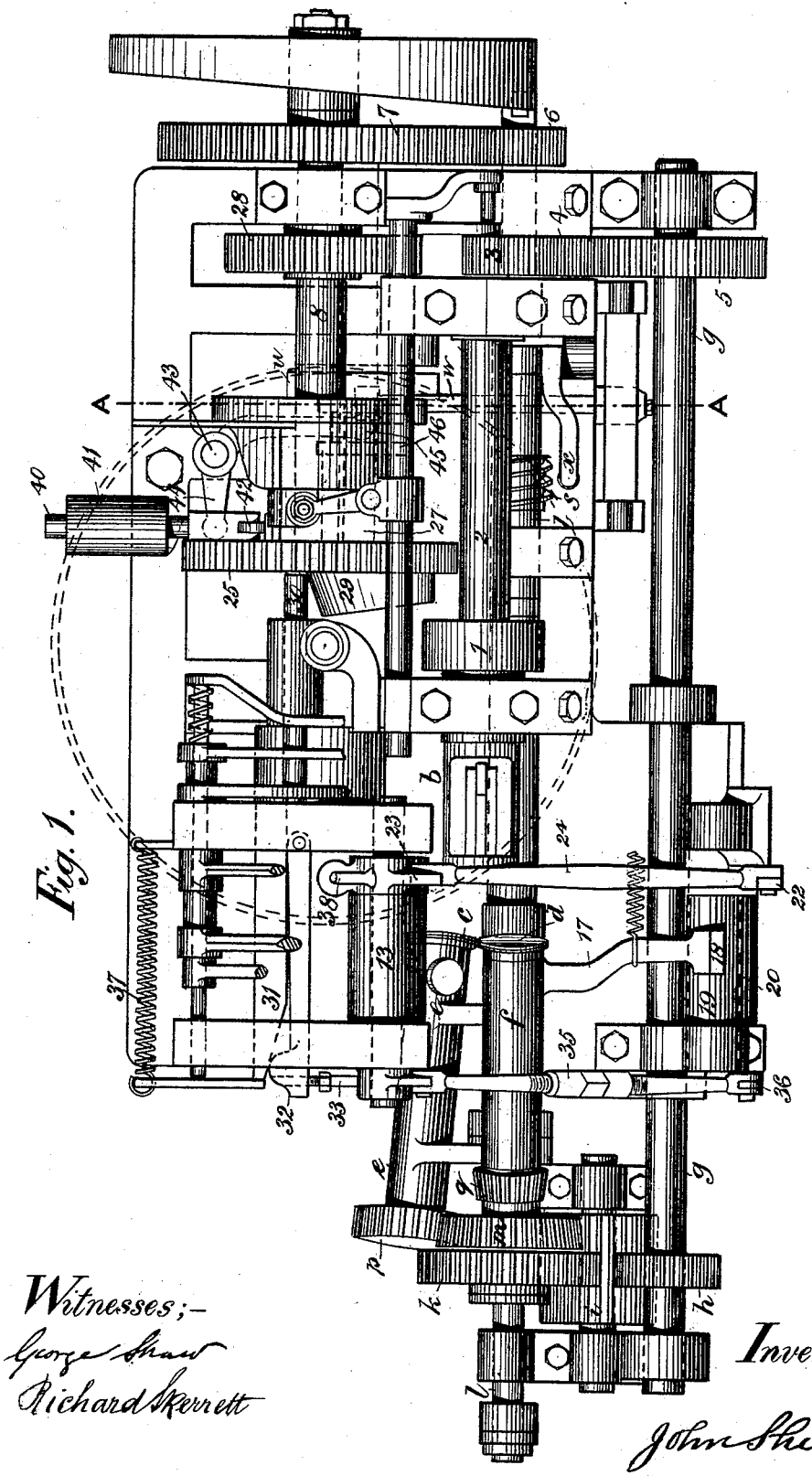

(No Model.) 7 Sheets—Sheet 1.

J. SHELDON.
MACHINE FOR ROLLING THE THREADS ON SCREWS.

No. 408,048. Patented July 30, 1889.

Witnesses:—
George Shaw
Richard Skerrett

Inventor:—
John Sheldon (No Model.) 7 Sheets—Sheet 2.

J. SHELDON.
MACHINE FOR ROLLING THE THREADS ON SCREWS.

No. 408,048. Patented July 30, 1889.

Witnesses:—
George Shaw
Richard Skerrett

Inventor:—
John Sheldon (No Model.) 7 Sheets—Sheet 3.
J. SHELDON.
MACHINE FOR ROLLING THE THREADS ON SCREWS.
No. 408,048. Patented July 30, 1889.

Witnesses:—
George Shaw
Richard Skerrett

Inventor:—
John Sheldon (No Model.) 7 Sheets—Sheet 4.
J. SHELDON.
MACHINE FOR ROLLING THE THREADS ON SCREWS.
No. 408,048. Patented July 30, 1889.
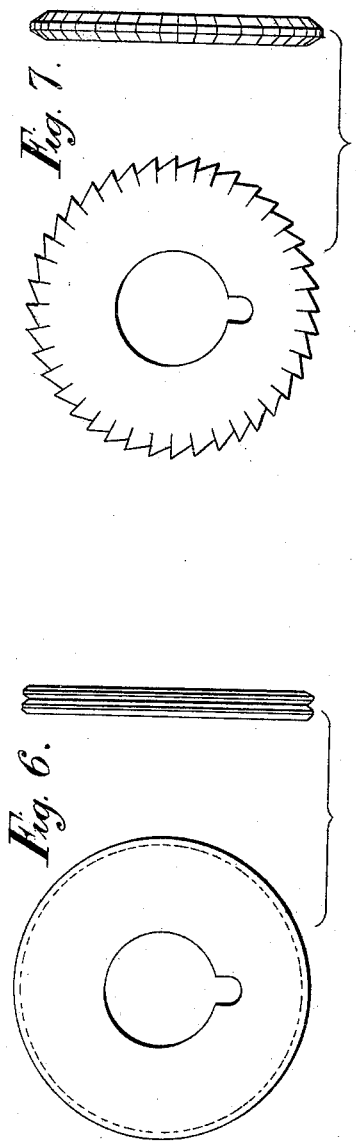
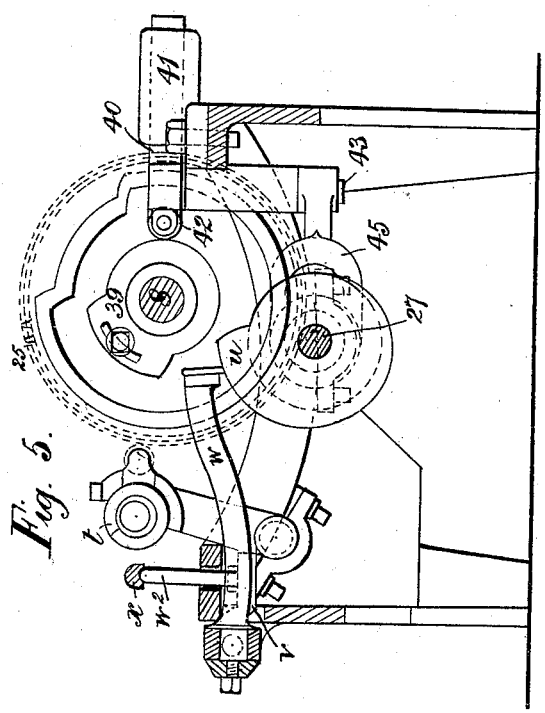
Witnesses:-
George Shaw
Richard Skerrett
Inventor:-
John Sheldon (No Model.) 7 Sheets—Sheet 5.
J. SHELDON.
MACHINE FOR ROLLING THE THREADS ON SCREWS.
No. 408,048. Patented July 30, 1889.
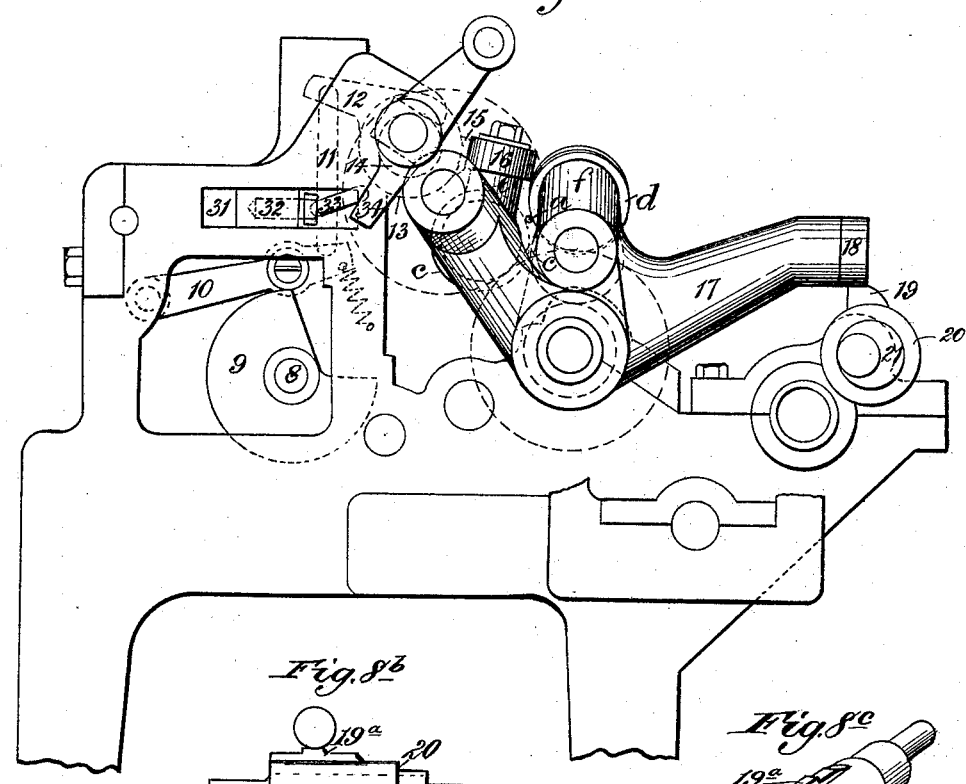
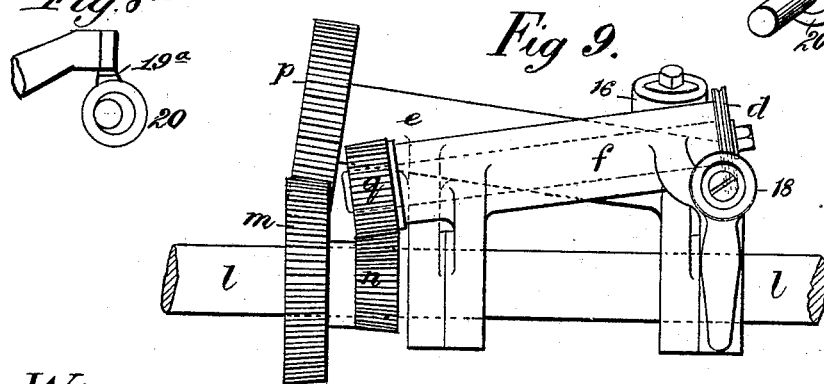

(No Model.) 7 Sheets—Sheet 6.
J. SHELDON.
MACHINE FOR ROLLING THE THREADS ON SCREWS.

No. 408,048. Patented July 30, 1889.

Witnesses;—
George Shaw
Richard Skerrett

Inventor;—
John Sheldon (No Model.) 7 Sheets—Sheet 7.
J. SHELDON.
MACHINE FOR ROLLING THE THREADS ON SCREWS.
No. 408,048. Patented July 30, 1889.
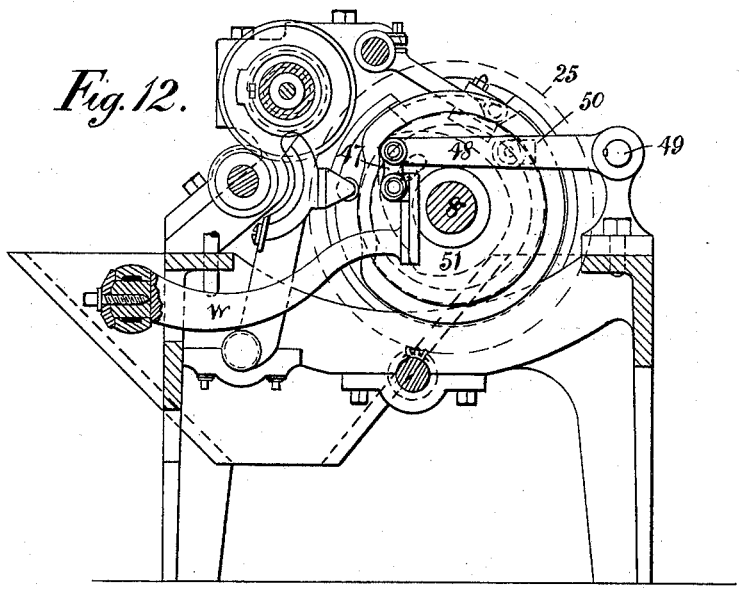
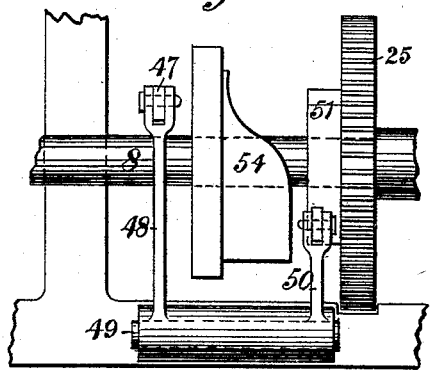
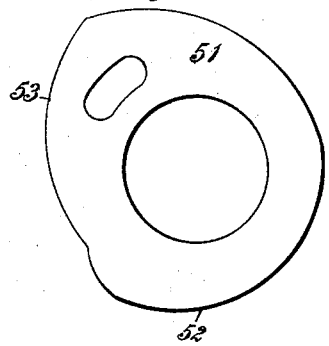
Witnesses:-
George Shaw
Richard Skerrett
Inventor:-
John Sheldon

UNITED STATES PATENT OFFICE.

JOHN SHELDON, OF BIRMINGHAM, COUNTY OF WARWICK, ENGLAND.

MACHINE FOR ROLLING THE THREADS ON SCREWS.

SPECIFICATION forming part of Letters Patent No. 408,048, dated July 30, 1889.

Application filed December 26, 1888. Serial No. 294,717. (No model.) Patented in England March 1, 1888, No. 3,158; in France December 3, 1888, No. 194,525, and in Belgium December 3, 1888, No. 84,161.

*To all whom it may concern:*

Be it known that I, JOHN SHELDON, of Birmingham, in the county of Warwick, England, a subject of the Queen of Great Britain, have invented certain new and useful Improvements in Machinery for the Manufacture of Metallic Screws and Screw-Bolts and other Metallic Articles having Screw-Threads upon them, (for which I have obtained a patent in Great Britain, dated March 1, 1888, No. 3,158; in France, dated December 3, 1888, No. 194,525, and in Belgium, dated December 3, 1888, No. 84,161,) of which the following is a specification.

My invention consists of the hereinafter-described improvements or changes in or additions to the screw machinery ordinarily employed for the manufacture of wood-screws, screw-bolts, and other articles having screw-threads upon them—such, for example, as augers and gimlets, gas-tubes, and the like.

In screw-making machinery as ordinarily constructed the screw-blank or article on which a screw-thread is to be made is put into rotation and a cutter or cutters is or are made to advance with a motion parallel to the axis of the rotating blank, and thereby to cut away portions of the blank, the uncut-away portion of the blank constituting a screw-thread.

According to my invention I dispense with the ordinary cutter or cutters and substitute either pressing-tools or rotary cutters, as hereinafter explained. When I employ pressing-tools, I form the said tools of hardened-steel circular disks, the peripheries of which have in cross-section the figure of one thread of the screw to be made and the space on each side of the said thread, together with one face of the threads on each side of the said complete thread. These circular pressing-disks are mounted on axes, on which they are secured by keys and screw-nuts. A pressing-tool of the kind described is situated at opposite sides of the blank operated upon, so that the pressure of one of the said tools is balanced by that of the other. These pressing-tools are pressed forcibly against the rotating blank with a slow motion in a line parallel to the axis of the rotating blank, and by their pressure displace those portions of the blank on which they operate, the undisplaced portions of the blank constituting a screw-thread. The said pressing-disks may either have an independent rotary motion given to them or they may have only the rotatory motion given to them by the rotating blank on which they operate.

In some cases, particularly when metals are to be operated upon which have little ductility, I use in place of the pressing-disks described rotary cutters. These rotary cutters have the figure of the space between two opposed faces of the screw-thread to be made, and their acting parts are made into cutting-surfaces. The said rotary cutters are mounted on axes by which rapid rotary motion is given to them. In addition to the said rotary motion they have slow motion in a line parallel to the axis of the blank. By the motions described, combined with the slow rotary motion of the supported blank, the required portions of the blank are cut away, leaving the required screw-thread.

I will now proceed to describe, with reference to the accompanying drawings, the manner in which my invention is to be performed.

Figure 2:
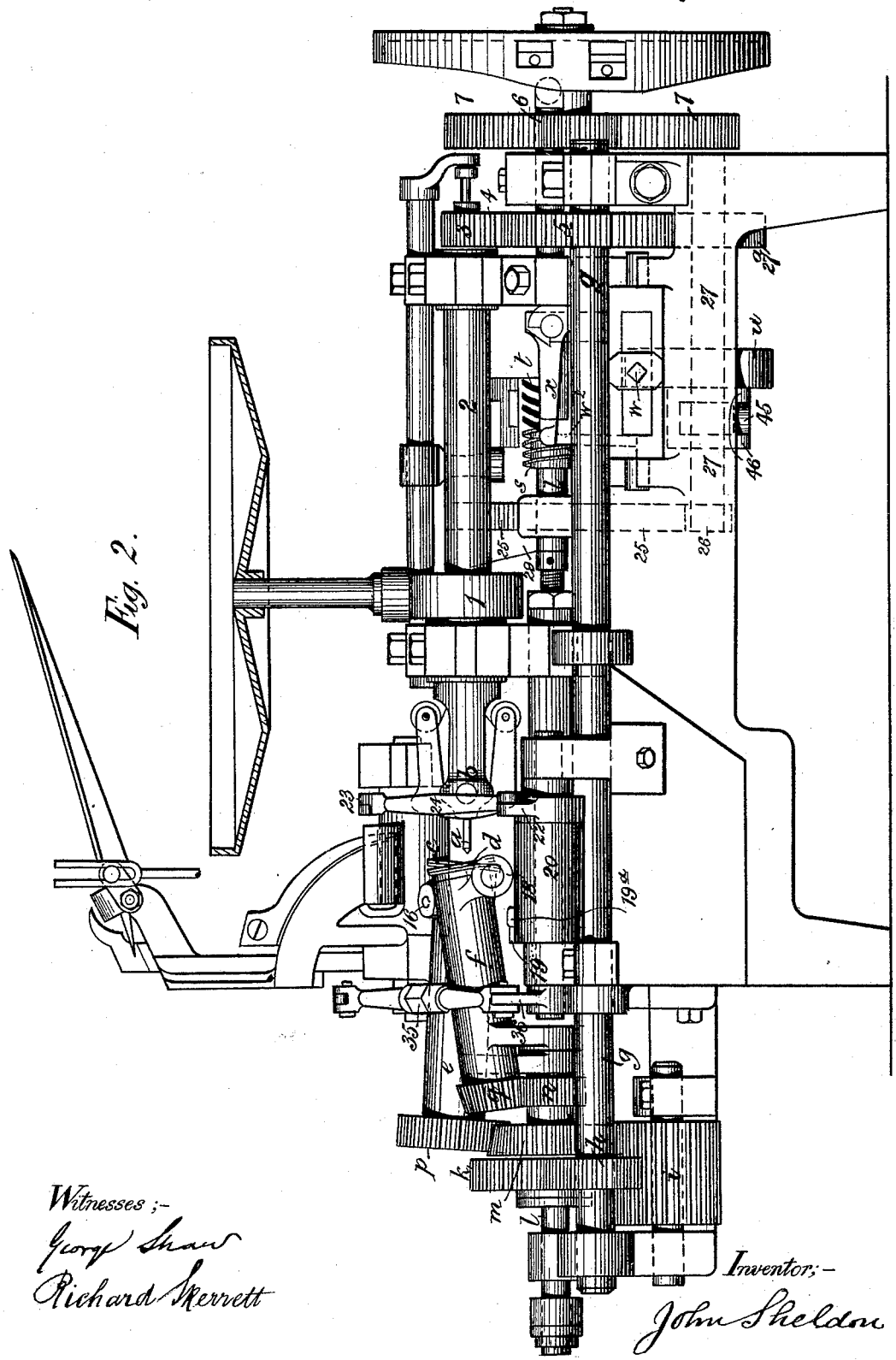
Figure 3:
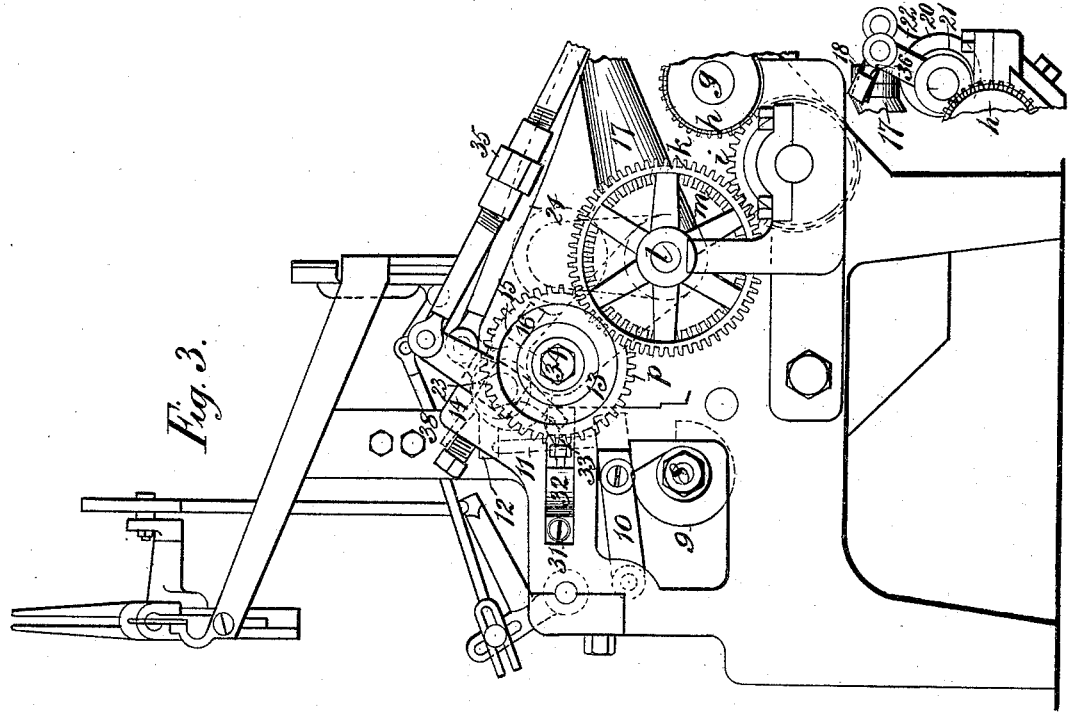
Figure 4:
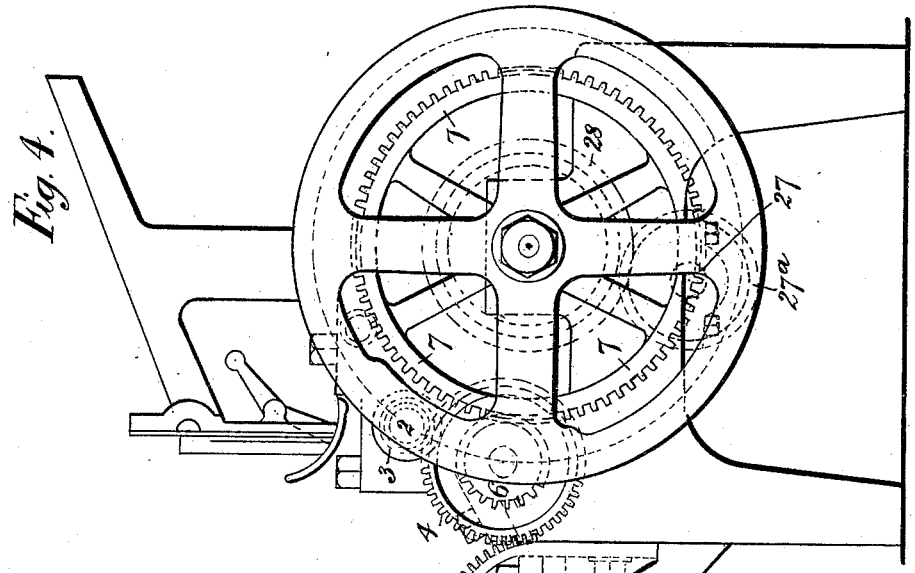
Figure 10:
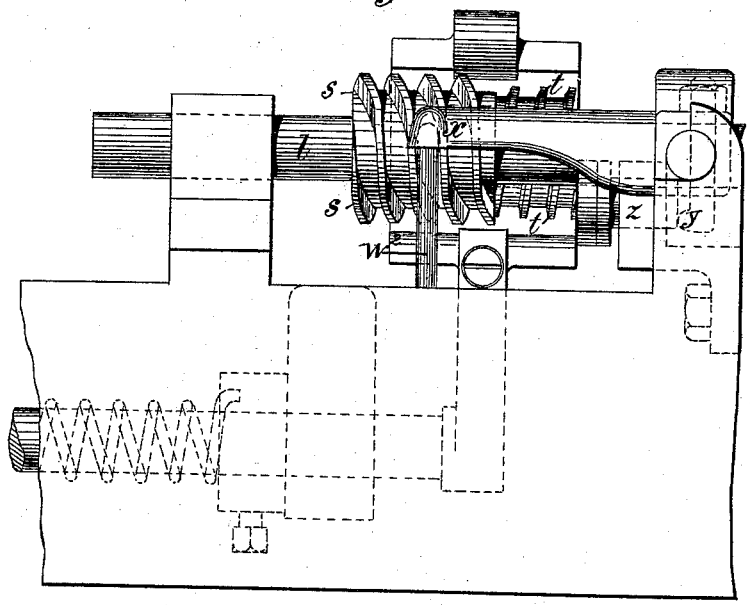
Figure 11:
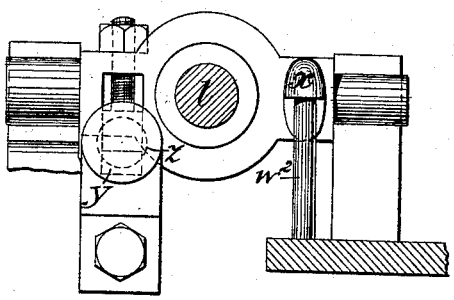

Figure 1 represents a plan, Fig. 2 a side elevation, and Figs. 3 and 4 elevations of the opposite ends of machinery for the manufacture of screws containing my improvements. Fig. 5 is a vertical section of the machinery, taken on the line A A, Fig. 1. Fig. 6 represents in edge view and side elevation one of the pressing-disks hereinafter described, and Fig. 7 represents in side and end elevation one of the rotary cutters hereinafter described. Fig. 8 represents an end elevation, and Fig. 9 a side elevation, of a portion of the machinery, drawn to a large scale; and Fig. 10 represents in side elevation, drawn to a large scale, that portion of the mechanism which effects the traversing and compensating motions of the worm by which the traversing motion of the tools is produced. Figs. 8ᵃ, 8ᵇ, and 8ᶜ are respectively an end view, a side view, and a perspective view in detail of the sleeve, to more clearly show the projections 19ᵃ; and Fig. 11 is an end elevation of the same, partly in section. Figs. 12, 13, and 14 represent mechanism for effecting the compensatory motion of the worm when the blank is operated upon several times by the pressing-tools.

As that part of the mechanism of the machinery represented which effects the feeding of the blanks on which screw-threads are to be formed as well as that part of the mechanism by which the blanks to be operated upon are gripped and made to rotate differ in no essential respect from mechanism commonly employed in screw-cutting machinery, I do not think it necessary to describe them in detail. I will, however, describe such modifications of the said mechanisms as are required in adapting to the machinery the special screw-threading appliances which constitute my invention.

The blank on which a screw-thread is to be formed is represented at $a$ in Figs. 2 and 8, and the gripping spindle and jaws by which the said blank $a$ is held and rotated is marked $b$ in said Fig. 2. The circular tools or pressing-disks are marked $c$ and $d$. One of the said pressing-disks $c\, d$ is shown separately, drawn to a large scale, in Fig. 6. Each of the said disks is made of hardened steel, and, as will be seen by referring to the edge view of Fig. 6, its periphery has in cross-section the figure of one thread of the screw to be made and the space on each side of the said thread, together with one face of the threads on each side of the said complete thread. The said pressing-disks $c\, d$ are carried on spindles or axes supported in the tubes or sleeves $e\, f$, and the said disks, as will be seen by referring to the drawings of the machine, press and operate upon opposite sides of the blank $a$ and are inclined in opposite directions, as will also be seen by the drawings. The said disks $c\, d$ may either turn freely on the spindles carrying them or be fixed thereto. In the former case the spindles themselves are fixed in the sleeves $e\, f$ and the disks $c\, d$ have no rotary motion excepting that communicated to them by the rotating blank $a$, situated between them and on which they are operating. In the latter case—that is to say, when the pressing-disks have an independent rotary motion communicated to them—they are fixed to the ends of the spindles carrying them and rotate with the said spindles. The spindles in this case turn freely in the sleeves $e\, f$ and have rotary motion communicated to them by the gearing represented, and which I will now proceed to describe. A rotary motion is communicated to the extra shaft $g$ from the primary driving-shaft by the gearing represented at the right-hand end of Figs. 1 and 2, and also in the end elevation, Fig. 3, the gearing for driving the extra shaft $g$ consisting of the pulley 1 on the shaft 2, carrying the pinion 3, gearing into the wheel 4, which gears with the wheel 5 on the extra shaft $g$. A toothed wheel $h$ on the shaft $g$ communicates motion to the broad-toothed wheel $i$. The toothed wheel $k$, which gears with the broad toothed wheel $i$, is carried by a sleeve which works freely on the shaft $l$. The said sleeve of the wheel $k$ also carries two beveled toothed wheels $m$ and $n$, and the said wheels $m$ and $n$ gear, respectively, with the beveled toothed wheels $p$ and $q$ on the ends of the shafts carrying the pressing-disks $c$ and $d$. By means of this gearing rotatory motion from the extra shaft $g$ is communicated to the shafts or spindles of the pressing-disks $c$ and $d$ in the required directions.

In place of the pressing-disks $c$ and $d$ rotary cutters may be employed of the kind represented in Fig. 7. It will be seen by an examination of said Fig. 7 that both the periphery of the rotary cutter and its inclined sides are cutting-surfaces having in section the figure of the space between two opposed faces of the screw-threads to be cut. In using the said rotary cutters they are fixed on the shafts in the sleeves $e\, f$ in place of the pressing-disks $c$ and $d$, and have a rotary motion communicated to them by the following modification of the gearing:

When the pressing-tools $c\, d$ are employed, they have rotation in the same direction, and the arrangement of gearing represented in Figs. 1, 2, and 3 is such as is suitable to give rotation to them in the required direction. When in place of the pressing-tools $c\, d$ rotary cutters of the kind represented in Fig. 7 are employed, the gearing represented requires to be modified. Both the cutters rotate in the same direction; but that direction is the reverse of the direction in which the pressing-tools $c\, d$ rotate; hence the necessity of modifying the gearing when rotary cutters are employed, so as to reverse the motion of the shafts carrying them. This is effected by the removal of the broad toothed wheel $i$ from the shaft on which it is represented and fixing the said broad toothed wheel $i$ on the shaft of the wheel $h$ in place of the said wheel $h$. The said broad toothed wheel $i$ will in this case gear directly with the toothed wheel $k$ and drive the cutters without the reversal of motion which it effects when it is made to gear the wheels $h$ and $k$ together. In addition to the rotary motion which must be communicated to the rotary cutters and may be communicated to the pressing-disks, these tools require to have a sliding or traversing motion parallel to the axis of the blank, so that besides rotating they are closed upon one another and travel from near the head of the blank toward the point end of the blank, and on nearing the point end the said tools still further close and approach one another, so as to operate upon the tapering point of the blank. Having finished the point of a screw, the said tools open or separate from one another and rapidly return in their open condition toward the head of the blank, where they again close and operate a second time on the rotating blank and complete the partially-formed thread. If necessary, the thread may be operated upon three or more times by the tools. The broad toothed wheel *i* permits of the required traversing motion of the tools and their appendages, while preserving the gearing of the parts by which the rotary motion of the pressing-tools or rotary cutters is effected.

I will now describe the mechanism whereby the opening and closing or the approaching and receding motions of the said tools are produced. The wheel 4 has a sleeve carrying the pinion 6, which gears with the large toothed wheel 7, driving the shaft 8. The end of the shaft 8 carries the cam 9, (see Figs. 3 and 8,) which operates on the lever 10, and the lever 10 lifts the rod 11, which operates on the lever 12, which carries the sleeve 13, (best seen in Fig. 8,) working on the eccentric 14. On the sleeve 13 is a projection 15, bearing against the roller 16 on the sleeve *e*, carrying the pressing-tool *c*. The other sleeve *f*, carrying the pressing-tool *d*, is at the same time made to operate on the blank by being pressed against it by means of the arm 17, carrying a roller 18, which roller is supported by the projection 19 on the sleeve 20, working on the eccentric 21. The sleeve 20 carries an arm 22, connected with the arm 23 by means of the rod 24, the said arm 23 being situated on the sleeve 13, hereinbefore described.

By the action of the parts last described the closing of the tools is effected, and while thus closed the tools perform their traversing motion from near the head of the blank to its point, and thereby effect the first cut or impression on the rotating blank. As the tools in their traversing motion approach the point of the blank, they require to be further closed in order to produce the thread on the tapering point of the blank. This further closing of the tools near the end of their traversing motion is effected by additional small projections on the sleeves 13 and 20. One of these projections is marked 19ª on the sleeve 20, Figs. 8ª, 8ᵇ, and 8ᶜ.

One cut or impression of the thread is effected on the blank and the tools opened, and by a sliding motion returned to their normal or original position during each rotation of the cam 9.

When the cam 9 is in operation, its curved part, acting on the lever 10, effects the closing of the pressing tools or disks *c d* to the required extent, and when, by the rotation of the cam, the curved part passes away from the lever 10 the latter falls out of action through the medium of a device—such as a coiled spring—and thus the tools are opened. The spring alluded to is indicated by dotted lines, Fig. 8; but the arrangement of spring shown may be varied to suit the conditions required.

I will now describe the arrangement by which after the rotating pressing tools or disks or rotary cutters have been closed upon the blank the required pressure is put upon the said tools and maintained during their action on the blank. 25 is a toothed wheel driven by the pinion 26 (see Fig. 2) from the shaft 27, which receives motion from the wheel 28 on the shaft 8 (see Fig. 1) through the wheel 27ª on the said shaft 27. On the side of the wheel 25 is a face-cam 29, against which the end of the rod 30 bears. By the rotation of the wheel 25 the cam 29 is made to urge forward the rod 30, which carries at its end the incline 31. In Fig. 1 the rod 30 is represented at the lowest point of the cam 29. The advance of the incline 31 advances the end of the lever 32, the return motion of the said incline being produced by the spring 37. The advance motion of the lever 32 is transmitted through the toggle-connecting rod 33 to the lever 34, keyed onto the end of the eccentric 14. The upper end of the said lever 34 is connected by means of an adjustable connecting-rod 35 to the lever 36, keyed to the eccentric 21 on the opposite side of the machine. The motion described of the lever 34 upon its eccentric, together with the motion transmitted from the said lever through the adjustable connecting-rod 35 and arm 36 to the eccentric 21, produces the required pressure upon the rollers 16 and 18, respectively, the roller 16 being pressed upon by the projection 15 on the sleeve 13 and the roller 18 being pressed upon by the projection 19 on the sleeve 20. The return motion of the tools is produced by a coiled spring connected with the arm 17, the arms falling back and the tools separating by the action of their own weight and the elasticity of the spring connected to the arm 17. A coiled spring fixed at one end to the peg 38 (see Figs. 1 and 3) and at the other end to a fixed portion of the framing pulls down the arm 12, when the said arm is at liberty to move, and restores it to its normal position.

When, in place of rotary cutters, the circular pressing-tools *c d* are employed, the mechanism requires to be modified in the manner which I will now proceed to explain.

As the pressing-tools do not remove any portion of the metal from the blank on which they form a thread, the said blank suffers a slight elongation by the operation of the said tools, and when the thread is operated on a second or a third time it is necessary that in each case the traversing motion shall be made somewhat greater in order to compensate the increased length of the blank. The pressing-disks, together with their sleeves and gearing, are carried on the shaft *l*, to which the required traversing motion is communicated by means of the thread or worm *s* on the said shaft *l* gearing with the series of teeth or comb *t*, as is well understood, the said series of teeth or comb constituting a half screw-box. The said parts *s* and *t* are well understood, and are commonly employed in screw-cutting machinery.

In the ordinary mechanism the comb *t* is capable of a slight advancing motion—that is, a motion in the direction in which the shaft $l$ advances; but the comb $t$ in my improved mechanism requires to have an advancing motion impressed upon it for the purpose of accommodating the traversing motion of the tools for the slightly-increased length of the partially-screwed blank. This motion of the comb $t$ is effected in the following manner: $u$ is a scroll or volute cam (see Fig. 5) on the shaft 27. $w$ is a lever, the end of which bears on the cam $u$. The short arm $v$ of this lever carries a connecting-rod $w^2$, the upper end of which bears against the under side of the end of the lever $x$. The axis of the said lever $x$ carries an adjustable short arm or lever $y$, which bears through the sliding piece $z$ against the comb $t$. On the lifting of the lever $x$ by the action of the cam $u$ the said short arm or lever $y$ presses forward the comb $t$ through the sliding piece $z$ to the extent required in the direction in which the axis or shaft $l$ is traveling. The construction of the parts I have just described is best seen in the enlarged views, Figs. 10 and 11.

When the pressing-tools are first operating upon the blank, no advancing motion of the comb $t$ is requisite. The cam $u$ in this case is inoperative in consequence of its position on the shaft 27. On the second operation of the said tools on the blank the mechanism last described for effecting the sliding motion of the comb $t$ is put into operation by the following means: 39 is a cam on the face of a toothed wheel 25. A rod 40, sliding in the bracket 41 and having at its inner end a roller 42, bears against the cam 39. This sliding rod 40 operates a horizontal lever 44 on the top of the vertical shaft 43, the lower end of which shaft carries the fork 45, which engages between collars 46 (indicated in dotted lines in Fig. 1) on a sleeve sliding on the shaft 27. This sliding sleeve carries the cam $u$. When the roller 42 bears against that portion of the cam 39 of shortest radius, the cam $u$ is in such a position on the shaft 27 as not to operate the lever $w$. When, however, the second action of the tools on the blank is about to commence, that portion of the cam 39 of longest radius operating on the roller 42 and rod 40 causes the fork 45 to slide the cam $u$ underneath the lever $w$, and thereby cause the requisite sliding motion of the cam $u$ during the second operation of the pressing tools or disks.

When the tools are made to operate a third time on the blank, a second compensation for the elongation of the blank must be made by an increased motion of the comb $t$. This may be effected by a series of rises side by side on the cam $u$; but I prefer, when more than one compensatory motion of the comb $t$ is required, to employ the mechanism represented in Figs. 12, 13, and 14, Fig. 12 representing the mechanism in side elevation, Fig. 13 a plan of a portion of the same, and Fig. 14 an elevation of the cam, hereinafter described.

In this mechanism the lever $w$ is connected by the link 47 to the lever 48, fixed on the end of the axis 49. The other end of the axis 49 has an arm or lever 50 parallel to the lever 48, but on the other side of the cam 54. 51 is a cam on the side of the toothed wheel 25 on the shaft 8. This cam is represented in elevation in Fig. 14, from which figure it will be seen that it has two rises 52 and 53, which rises, operating at the required times on the roller on the end of the arm 50, produce the requisite motions in the lever $w$ to effect the necessary advance motion of the comb $t$.

The parts of the machinery which I have not described resemble those of ordinary screw-making machinery, or differ therefrom only in such unimportant respects as the adaptation of my improvements renders necessary, which changes will be sufficiently evident to a machinist conversant with screw-making machinery.

I have described and represented machinery in which two circular impressing disks or tools or two rotary cutters are employed, the said tools and cutters respectively being situated at and operating on opposite points of the blank and their pressures balancing each other. Instead, however, of employing the said tools and cutters in duplicate, a single tool or a single cutter may be employed. In these cases the pressure of the single tool or cutter on one side of the blank must be borne by a support on the other side of the blank, as in the ordinary screw-cutting machinery. As the construction and arrangement and operation of the said support differs in no essential respect from the supports employed in ordinary screw-cutting machinery, I do not think it necessary to describe the same. I wish it, however, to be understood that I prefer to employ pairs of the tools or cutters, as hereinbefore described, and represented in the accompanying drawings.

Although I have only represented and described my invention in its application to the worming or threading of a screw-blank for the manufacture of a screw of the kind commonly called a "wood-screw," yet my said invention is also applicable to the worming or threading of screw-bolts and other metallic articles requiring screw-threads upon them; but as the machinery constituting my invention requires no essential change to fit it for the worming or screwing of screw-bolts and other articles I do not consider any further description of my said invention necessary.

Having now particularly described and ascertained the nature of my said invention and the manner in which the same is to be performed, I declare that I claim as my invention of improvements in machinery for the manufacture of metallic screws and screw-bolts and other metallic articles having screw-threads upon them—

1. In a screw-cutting machine, the combination, with a rotary gripping spindle and jaws for holding and rotating the screw-blank, of a pressing-disk having an annular sharp edge rotating in contact with the rotating screw-blank and moving in a line parallel to the axis of the rotating blank, so that the disk in its travel along the blank displaces portions thereof to constitute a screw-thread, substantially as described.

2. In a screw-cutting machine, the combination, with a gripping spindle and jaws rotating but immovable lengthwise for holding and rotating the screw-blank, of the disk-carrying spindles inclined relatively to each other and arranged at opposite sides of the blank, the pressing-disks mounted, respectively, on the spindles, and each having a sharp annular edge rotating in contact with the rotating blank, and means, substantially as described, for slowly moving the disks and their shafts parallel to the axis of the rotating blank, so that the disks in their travel along the blank displace portions thereof to constitute a screw-thread, substantially as described.

3. In a screw-cutting machine, the combination, with a rotating gripping spindle and jaws for holding and rotating a screw-blank, of the disk-carrying spindles mounted in sleeves inclined relatively to each other at opposite sides of the blank, the pressing-disks mounted, respectively, on the spindles, and means for closing the disks upon the rotating blank, causing the disks, spindles, and sleeves to slowly move parallel to the axis of the blank, and opening the disks to release the blank when the thread is finished, substantially as described.

4. In a screw-cutting machine, the combination, with a rotating gripping spindle and jaws for holding and rotating a screw-blank, of the disk-carrying spindles mounted in sleeves inclined relatively to each other at opposite sides of the blank, the pressing-disks mounted, respectively, on the spindles and having annular sharp edges, a lengthwise-movable shaft carrying the sleeves, means for moving said shaft back and forth for causing the disks to travel in a line parallel to the axis of the rotating blank, and means for closing the disks on the blank and opening them when the screw-thread is finished, substantially as described.

5. In a screw-cutting machine, the combination, with a rotating gripping spindle and jaws for holding and rotating a screw-blank, of a pair of disk-carrying spindles located at opposite sides of the blank and inclined relatively to each other, the thread-forming disks having annular sharp edges and mounted, respectively, on the spindles, mechanism for moving the spindles and disks parallel to the axis of the rotating blank, and means for closing the disks on the blank and imparting additional pressure to the disks on approaching the point end of the blank, substantially as described.

6. In a screw-cutting machine, the combination, with a gripping spindle and jaws for holding and rotating a screw-blank, of a pair of disks having annular sharp edges rotating in contact with the rotating blank and moving in a line parallel to the axis of the blank, and means, substantially as described, for increasing the pressure of the disks on the blank as they approach the point end of the latter, substantially as described.

JOHN SHELDON. [L. S.]

Witnesses:
 RICHARD SKERRETT,
 GEORGE SHAW.